C. B. GINN.
TESTING MACHINE FOR MOTOR VEHICLES.
APPLICATION FILED AUG. 30, 1920.
1,421,000.
Patented June 27, 1922.
2 SHEETS—SHEET 2.
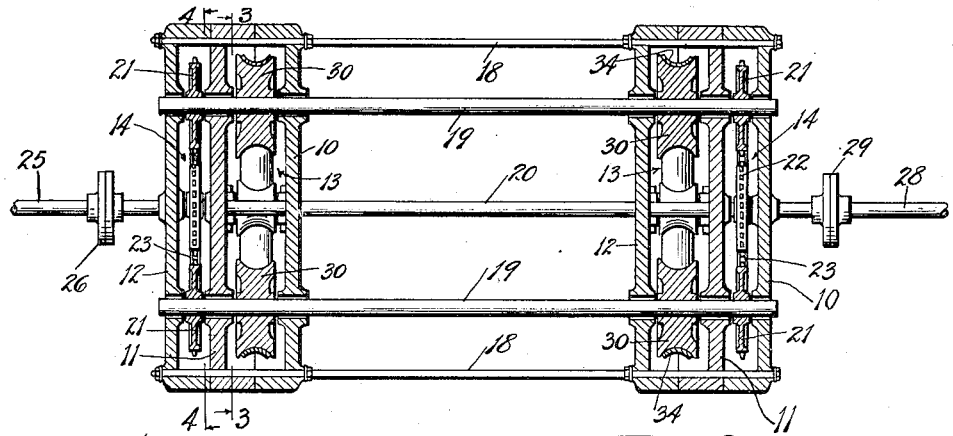
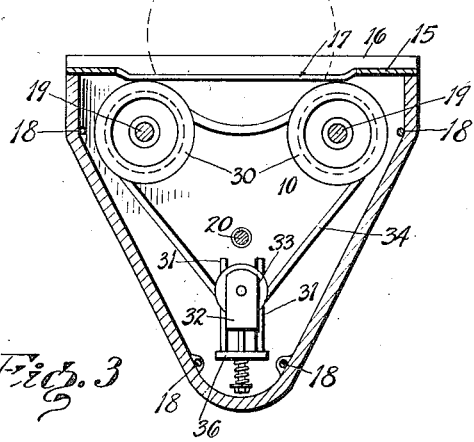
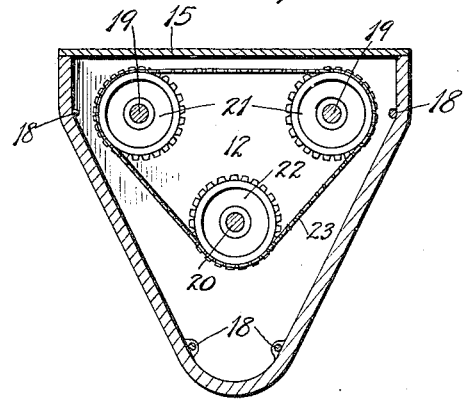
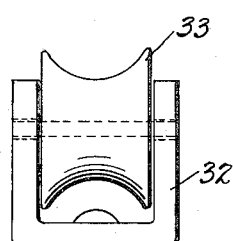
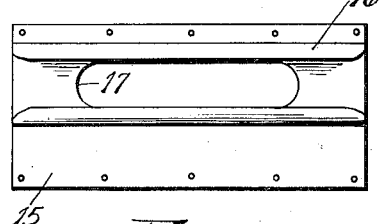
Inventor
C. B. Ginn.
By Lacy & Lacy, Attorneys

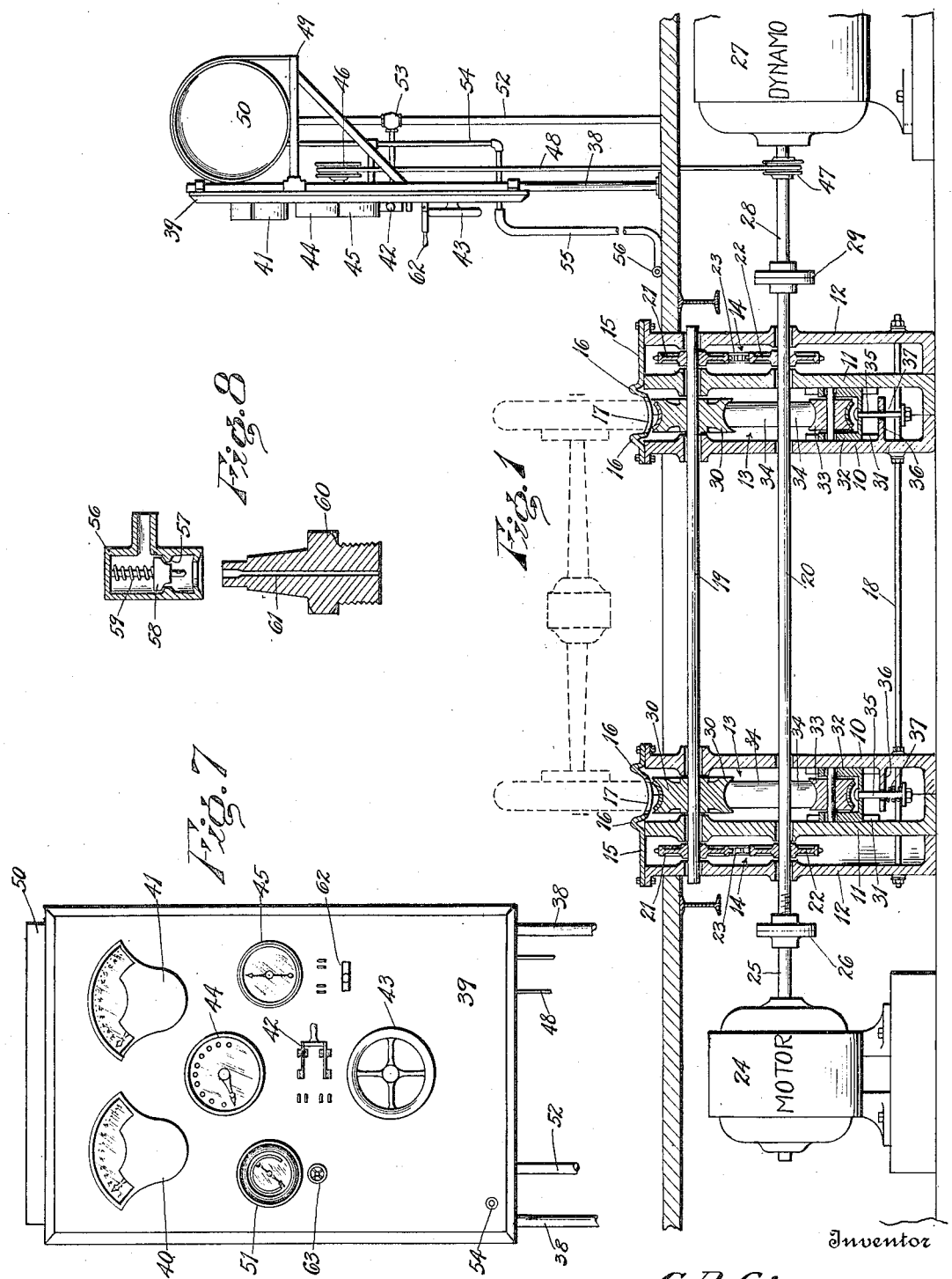

UNITED STATES PATENT OFFICE.

CARRELVERNON B. GINN, OF BRENHAM, TEXAS, ASSIGNOR OF ONE-HALF TO PAUL D. GINN, OF BRENHAM, TEXAS.

TESTING MACHINE FOR MOTOR VEHICLES.

1,421,000.          Specification of Letters Patent.    Patented June 27, 1922.

Application filed August 30, 1920. Serial No. 406,789.

*To all whom it may concern:*

Be it known that I, CARRELVERNON B. GINN, citizen of the United States, residing at Brenham, in the county of Washington and State of Texas, have invented certain new and useful Improvements in Testing Machines for Motor Vehicles, of which the following is a specification.

This invention relates to an improved testing device for motor vehicles and has as one of its principal objects to provide a machine whereby the engine and associated moving parts of an automobile may be set in motion and tested while the vehicle is standing still.

A further object of the invention is to provide a machine which may be driven by the motive power of the vehicle for ascertaining a test rating of the horsepower which the engine of the vehicle is capable of developing.

A still further object of the invention is to provide a machine which may be employed for driving the rear wheels of a vehicle and consequently, if desired, driving the vehicle motor.

And the invention has as a still further object to provide a machine adapted for testing motor vehicles of various conventional makes and which will accordingly be found particularly convenient and useful as a part of the equipment of all motor vehicle manufacturers, including garages and repair shops.

Other and incidental objects will appear hereinafter.

In the drawings:

Figure 1 is a vertical section of my improved machine,

Figure 2 is a fragmentary horizontal sectional view of the machine,

Figure 3 is a section on the line 3—3 of Figure 2, looking in the direction of the arrows, Figure 4 is a section on the line 4—4 of Figure 2, looking in the direction of the arrows, Figure 5 is a detail view showing one of the tensioning pulleys employed in connection with the traction belts of the device, Figure 6 is a plan view showing one of the cover plates of the traction units of the device, Figure 7 is an elevation showing the instrument board employed in connection with the machine, and Figure 8 is a sectional view showing the plug and valve employed for making compression tests upon engine cylinders.

In carrying the invention into effect, I employ companion traction units which, as particularly shown in Figure 1, are preferably mounted within a suitable pit and each of which comprises a casing resting at its lower end in the bottom of the pit. The casing of each of said units is formed of mating sections 10, 11 and 12 defining compartments 13 and 14 closed at their lower ends while, at their upper ends, said compartments are open. Secured upon the upper ends of the casings of said units are cover plates 15, each of which is bent to provide a pair of spaced guide ribs 16 defining a trough therebetween and formed through each of said plates between said ribs is an opening 17, these openings entering the compartments 13 of the casings. Extending between the casings of the traction units is a plurality of tie rods 18 rigidly connecting and supporting the units in spaced relation as well as securing the sections of the unit casings together.

As will now be observed upon reference to Figures 3 and 4 of the drawings, the casings of the traction units are substantially triangular in general configuration and extending through the casings of both of said units, adjacent the upper ends thereof, is a pair of spaced horizontal shafts 19. Extending through the casings below these shafts and in a plane midway therebetween is a third shaft 20. All of these shafts are suitably journaled upon the casings and mounted upon the shafts 19 within the compartments 14 of the casings are, as shown in detail in Figure 4, sprockets 21. Mounted upon the shaft 20 within said compartments are sprockets 22 and trained around the sprockets of each compartment is a sprocket chain 23. Mounted within the pit along with the traction units is a preferably electric motor conventionally illustrated at 24. The drive shaft 25 of this motor is disposed in axial alinement with the shaft 20 at one end thereof and interposed between said shafts is a suitable clutch or coupling 26 for detachably connecting the shafts. Within the pit at the opposite end of the shaft 20 is a dynamo as conventionally illustrated at 27 having an armature shaft 28 extending in alinement with the shaft 20 and interposed between said shafts is a suitable clutch or coupling 29 similar to the coupling 26 for detachably connecting the shafts. Fixed to the shafts 19 within the compartments 13 of the traction units are, as shown in detail in Figure 3, pulleys 30. These pulleys are arranged beneath opposite end portions of the openings 17 in the cover plates 15 in such position that said pulleys will, as suggested in Figure 2, support the rear wheels of a motor vehicle and, as will be observed, the pulleys are formed with concave faces to fit the tires of said wheels. Within each of the compartments 13 of the traction unit casings, the sections 10 and 11 thereof are formed at their lower end portions with vertical guide cleats 31 and coacting with these cleats is a vertical reciprocable pulley yoke 32 upon which is journaled a pulley 33 having a concave face similar to the concave faces of the pulleys 30. Trained around the pulleys 30 and 33 within each of said compartments is a traction belt 34. These belts may be of leather, canvas or other approved material. Depending from the yokes 32 are yoke stems 35 which are freely fitted through bracket arms 36 extending from the sections 10 of the casing and at their lower end portions, carry tensioning springs 37, the springs bearing at their lower ends against suitable washers upon the stems and the stems being equipped with nuts adjustable for tensioning the springs. Thus, it will be seen that the springs 37 will normally serve to maintain the belts 34 taut, fitting the concave faces of the pulleys. However, when the rear wheels of a motor vehicle are engaged with the pairs of pulleys 30, as suggested in Figure 2, the weight of the vehicle will sag the upper reaches of the belts downwardly until the wheels are supported by the pulleys. Thus, it will be seen that the springs 37 will be brought under tension acting to tightly hold the upper reaches of the belts in engagement with the tires of the wheels so that said belts will provide ample traction surface for the wheels to prevent slipping thereof, the upper reaches of the belts conforming to the contour of the wheel tires.

Upstanding near the pit in which the traction units are mounted are suitable posts 38 to which is secured an instrument board 39. Mounted upon this instrument board is a volt meter conventionally shown at 40. The board also carries an ammeter conventionally shown at 41. These instruments are, of course, in circuit with the dynamo and mounted upon the instrument board for controlling flow of current to the dynamo and motor selectively, is a switch 42. Controlling flow of current from the dynamo to a suitable resistance is a hand wheel 43. In circuit with the motor is a rheostat 44 upon the board.

The board also carries a tacometer 45, the shaft of which extends through the board and, at its rear end, carries a pulley 46. Upon the shaft 28 of the dynamo is a pulley 47 and trained around these pulleys is a drive belt 48. Extending rearwardly from the post 38 is a shelf 49 upon which is mounted an air tank 50 and connected with this tank is a suitable air gauge 51 upon the instrument board. Leading preferably from a suitable air storage tank to the tank 50 is a pipe 52 in which is interposed a valve 53 and leading from the tank 50 forwardly through the instrument board is a pipe 54. A hose 55 is connected to this pipe and mounted upon the outer end of the hose is an air valve 56. As shown in detail in Figure 8, this valve includes a casing which is formed with an internal valve seat 57 and normally cooperating with said seat is a valve 58 held in closed position by a spring 59 surrounding the valve stem. In conjunction with the valve 56, a plug 60 is employed, this plug being threaded to screw into the spark plug orifice of an engine cylinder and having a passage 61 therethrough. The upper end portion of this passage is enlarged to receive the lower end of the stem of the valve 58 so that the valve casing may be fitted over the upper reduced end of the plug for opening the valve and permitting flow of air through the valve casing and through the plug. A switch 62 is provided upon the board for cutting off dynamo current from control, for resistance, while from the valve 53 extends a shaft provided at the front of the board with a hand wheel 63 operable for opening or closing the valve.

As will now be readily understood in view of the preceding description, an automobile may be driven over the traction units and the rear wheels of the vehicle caused to enter the troughs of the cover plates 15 between the pairs of guide ribs 16 so that said wheels will drop through the openings 17 of the cover plates into engagement with the pairs of pulleys 30. As will be clear, the rear wheels of the vehicle may then be driven by the vehicle engine while the vehicle is standing still. Consequently, since the engine and associated moving parts of the vehicle will be in operation, the vehicle may be readily tested to locate loose bearings, loose connecting rods, leaky valves and pistons transmission trouble, differential trouble, brake trouble and, in fact, all automobile troubles usually found by road tests. To locate loose bearings the dynamo 27 is disconnected from the shaft 24 and the motor connected thereto. Consequently, as will be at once appreciated, the motor may then be operated for driving the rear wheels of the vehicle so that by removing the bottom plate of the engine crank case, the connecting rod bearings and the main crank shaft bearings of the engine may be inspected while these parts are in motion, it being possible by means of the rheostat 44 to drive the engine at any desired speed. By releasing the clutch on the automobile, the transmission may be tested, only the rear wheels, rear axle, differential and transmission being then in motion. By placing the gear set in neutral, the differential may be tested for gear mesh and, at the same time, examination may be made for sprung axles, worn axle bearings, or warped wheels. While the engine is driven by the motor, ignition tests may also be made. By removing the engine spark plugs and laying them on the engine, th spark occurring at each of the plugs may be readily observed and by varying the speed of the motor 24, it can be readily determined whether or not all of the plugs spark uniformly. By disconnecting the motor 24 from the shaft 20 and connecting the dynamo 27 therewith, the engine of the vehicle may be readily tested as will be well understood, to determine the tractive effort of the rear wheels of the vehicle and indirectly the horsepower which the engine is capable of developing, readings being had, of course, upon the volt meter and ammeter. By means of the tacometer, the speed of the engine may be determined, allowance being made, of course, for the gear ratio of the vehicle and the diameter of the rear wheels. To test for leaky valves, pistons, piston rings, and valve plugs, the spark plug of a cylinder is removed when the plug 60 is inserted into the spark plug orifice. From the main storage tank, air is then let into the tank 50 up to a desired pressure which may be readily determined by means of the gauge 51. The valve 56 is then fitted over the plug 60 and air permitted to flow from the tank 50 into the cylinder. In this way, it may be determined how long the cylinder will hold a given air pressure, the intake and exhaust valves of the cylinder being, of course, closed. All of the cylinders of the engine are tested in like manner.

Having thus described the invention, what is claimed as new is:

1. A machine for testing motor vehicles including spaced wheel traction means coupled to turn in unison, a shaft common to both of said means and coupled therewith, a motor at one end of said shaft, means for coupling the motor with the shaft, a dynamo at the other end of said shaft, and means for coupling the dynamo with the shaft.

2. A machine for testing motor vehicles including spaced traction units, shafts extending between the units and journaled thereon, pairs of wheel traction pulleys carried by the shafts, a third shaft extending between the units and journaled thereon, means coupling all of said shafts to turn in unison, and means for driving one of said shafts.

3. A machine for testing motor vehicles including spaced traction units each comprising a casing, shafts extending between said casings and journaled thereon, a pair of wheel traction pulleys mounted upon the shafts within each of the casings, a third shaft extending between the casings and journaled thereon, means within each casing coupling all of the shafts to turn in unison, and means for driving the latter shaft.

4. A machine for testing motor vehicles including spaced traction units each comprising a pair of wheel engaging traction pulleys, a traction belt trained around the pulleys of each pair, and means for tensioning said belts.

5. A machine for testing motor vehicles including spaced traction units each comprising a pair of wheel engaging traction pulleys, a traction belt trained around the pulleys of each pair, idler pulleys coacting with the belts, and springs acting upon the idler pulleys for tensioning the belts.

6. A machine for testing motor vehicles including spaced traction units each including a casing formed of a plurality of sections mating to define a pulley compartment and a sprocket compartment, tie rods extending between the units and securing the sections of each of the casings together, shafts extending between the units and journaled upon said sections, a pair of wheel traction pulleys mounted upon said shafts within the pulley compartment of each of the casings, spring actuated idler pulleys mounted in said compartments, traction belts trained around the pulleys of each compartment, a third shaft extending between the units and journaled upon said casings, sprockets carried by all of the shafts within the sprocket compartments of the casings, and a sprocket chain trained around the sprockets of each compartment coupling the shafts to turn in unison.

7. A machine for testing motor vehicles including wheel traction means, a shaft associated with said means coupled therewith, a motor, means for coupling the motor with the shaft, a dynamo, and means for coupling the dynamo with the shaft.

In testimony whereof I affix my signature.

CARREL VERNON B. GINN. [L. S.]